United States Patent

Dobson, Jr. et al.

Patent Number: 5,728,654
Date of Patent: Mar. 17, 1998

[54] STABILIZED FLUIDS CONTAINING SOLUBLE ZINC

[75] Inventors: James W. Dobson, Jr., Houston; James P. Cashon, Missouri City, both of Tex.

[73] Assignee: Texas United Chemical Company, LLC., Houston, Tex.

[21] Appl. No.: 758,496

[22] Filed: Dec. 2, 1996

Related U.S. Application Data

[63] Continuation-in-part of Ser. No. 512,675, Aug. 25, 1995.

[51] Int. Cl.$^6$ .................... C09K 7/02; C09K 7/00
[52] U.S. Cl. ................ 507/272; 507/110; 507/111; 507/140; 507/212; 507/213; 507/269; 507/906
[58] Field of Search ............................. 507/110, 111, 507/140, 212, 213, 269, 272, 906

[56] References Cited

U.S. PATENT DOCUMENTS

| | | | |
|---|---|---|---|
| 4,190,110 | 2/1980 | Beirute | 507/272 |
| 4,276,182 | 6/1981 | Beirute | 507/272 |
| 4,427,556 | 1/1984 | House et al. | 507/272 |
| 4,704,214 | 11/1987 | Russell et al. | 507/272 |
| 4,822,500 | 4/1989 | Dobson, Jr. et al. | 507/212 |
| 4,941,982 | 7/1990 | Dadger et al. | 507/272 |
| 5,301,754 | 4/1994 | Cowan et al. | 507/140 |
| 5,514,644 | 5/1996 | Dobson | 507/212 |

*Primary Examiner*—Philip Tucker
*Attorney, Agent, or Firm*—Roy F. House

[57] ABSTRACT

Disclosed are low solids, high density fluids useful as drilling, workover, and completion fluids and the like in oil and gas well operations. The fluids comprise a brine having dissolved therein a zinc salt such as zinc bromide, and optionally one or more additional water soluble salts, a viscosifier which is a high surface area silica, a biopolymer viscosifier, a fluid loss control additive which is preferably a starch derivative, zinc carbonate, and, optionally, an alkaline buffer, a polar additive, and a bridging agent.

It has been found that zinc carbonate will increase the low shear rate viscosity of fluids containing a zinc salt dissolved therein. Additionally, the combination of zinc carbonate and zinc oxide as the alkaline buffer provides fluids having increased thermal stability as indicated by the low shear rate viscosity of the fluids.

14 Claims, No Drawings

STABILIZED FLUIDS CONTAINING SOLUBLE ZINC

This is a continuation in part of Ser. No. 08/512,675 filed Aug. 25, 1995 now pending.

BACKGROUND OF THE INVENTION

The invention relates to oil and gas well drilling and servicing fluids containing one or more water soluble zinc salts, such as zinc bromide. In particular, the invention provides a method of enhancing the low shear rate viscosity of brine-based, polysaccharide-containing fluids containing a source of soluble zinc upon aging the fluids at elevated temperatures.

In the drilling of well bores penetrating subterranean formations, drilling fluids are generally circulated through the well bores to remove cuttings therefrom and accomplish other purposes. Most drilling fluids are comprised of suspended particles of hydrated clay in water and weighting materials such as barite are frequently combined with the drilling fluids to increase the densities thereof. Various additives are also commonly utilized in drilling fluids to impart desired properties thereto, such as to bring about low fluid loss from the drilling fluids to subterranean formations in contact therewith. However, once a well bore penetrates a subterranean formation containing desired hydrocarbon fluids, insoluble materials in the drilling fluid such as clay and barite can be damaging to the formation. That is, a filter cake or sheath of such insoluble material can form on the face of the formation and some solids of the filter cake can penetrate into the formation which in turn can result in a permanent reduction in the permeability and hydrocarbon producing ability of the formation.

In order to prevent damage to producing formations during the drilling and completion of well bores penetrating such formations and during subsequently carried out workover procedures, non-damaging brines have heretofore been utilized in lieu of drilling fluids containing insoluble solids. The brines are non-damaging because the salts contained therein which provide density to the brines are dissolved, and no solids are placed in contact with the formation thereby. Because such drilling, completion, and workover brines do not contain undissolved solids, they are commonly referred to as "clear brines."

In operations carded out in well bores penetrating subterranean formations containing fluids under high pressures, the brines utilized must have very high densities, e.g., densities in the range of from about 1080 to 2580 kg/m$^3$ (9.0 to 21.5 pounds per gallon), in order to prevent the pressurized fluids from blowing out of the wellbore. These brines typically contain KCl, NaCl, CaCl$_2$, NaBr, CaBr$_2$, KBr, ZnCl$_2$, ZnBr$_2$, sodium formate, potassium formate, and cesium formate or combinations of such salts, and are of relatively high cost.

Because of the high cost of high density drilling, completion and workover brines, they are usually recovered, filtered, and reused in well servicing operations. The loss of such brines is expensive and undesirable and as a result, fluid loss reduction procedures and additives have heretofore been utilized with high density brines. These include increasing the viscosity of the brines by combining hydratable viscosifiers therewith such as hydroxyethylcellulose and derivatized polysaccharides. While combining such viscosifiers with high density brines has resulted in the reduction of fluid loss, the disadvantages are that relatively large quantities of the viscosifiers are required, difficulties are often encountered in dissolving and hydrating the viscosifiers in high density brines, especially brines containing zinc bromides, and the viscosity produced is often lost or greatly lessened when the brines are used in relatively high temperature or low pH environments.

U.S. Pat. Nos. 4,175,042 and 4,822,500, incorporated herein by reference for all purposes, disclose drilling, workover and completion fluids comprising a saturated brine solution in which a water soluble salt, which is not soluble in the saturated brine, of a particular size range is suspended in the saturated brine along with suitable polymeric viscosity and suspension additives and suitable fluid loss control agents. Representative saturated brines may contain one or more salts such as KCl, NaCl, CaCl$_2$, ZnCl$_2$, KBr, NaBr, CaBr$_2$, ZnBr$_2$, Na$_2$SO$_4$, Na$_2$CO$_3$, K$_2$CO$_3$, and NaHCO$_3$. Representative water soluble, particulate sized salts are KCl, NaCl, CaCl$_2$, CaBr$_2$, Na$_2$SO$_4$, Na$_2$CO$_3$, K$_2$CO$_3$, and NaHCO$_3$. Representative viscosity and suspension additives are: xanthan gum, cellulose ethers, and guar gum derivatives. Representative fluid loss control additives are: calcium, chrome, or ferrochrome lignosulfonates; carboxymethylcellulose; and starches such as corn, potato, and tapioca, and their derivatives. U.S. Pat. No. 4,822,500 discloses that xanthan gum and a particular epichlorohydrin crosslinked hydroxypropyl starch synergistically combine in the saturated brine to provide excellent suspension and fluid loss control. Such fluids have been eminently successful, and are a preferred fluid for drilling in hydrocarbon bearing formations, such as in "horizontal drilling."

It has been proposed in the co-pending U.S. patent application of James W. Dobson, Jr. et al., Ser. No. 08/512,675 filed Aug. 25, 1995, incorporated herein by reference, to provide low solids, zinc-containing brine fluids which produce a thin, low permeability filter cake on the sides of the borehole contacted by the fluids. The fluids contain one or more polysaccharide polymer viscosifiers, an amorphous silica viscosifier, a polymeric fluid loss control additive, a bridging agent, and optionally, an alkalinity control additive. Co-pending United States patent application of James W. Dobson, Jr. et at., Ser. No. 08/386,443 filed Feb. 10, 1995, incorporated herein by reference, provides low solids, zinc-containing brine fluids which produce a thin, low permeability filter cake on the sides of the borehole contacted by the fluids. The fluids comprise a brine, an amorphous silica viscosifier, a fluid loss control additive, a bridging agent, and optionally an alkaline buffer.

SUMMARY OF THE INVENTION

It has now been found that low solids, high density fluids having excellent rheological and filtration characteristics, and good thermal stability, are provided by the fluids of this invention.

The fluids of this invention comprise a water soluble zinc salt-containing brine, an amorphous silica viscosifier, a biopolymer viscosifier, a fluid loss control additive, and zinc carbonate. Optionally the fluids also contain a low molecular weight polar additive, a bridging agent and an alkaline buffer, preferably zinc oxide, as more particularly described herein.

The low solids, high density fluids of this invention are useful as drilling fluids for oil and gas, particularly when drilling into hydrocarbon-containing formations, workover fluids, and completion fluids. The fluids provide excellent filtration properties providing extremely thin filter cakes. This provides more readily removable filter cakes, easier well clean-up, and better hydrocarbon production. The excellent low shear rate viscosity (rheological properties) of the fluids provide excellent suspension and hole cleaning properties.

The zinc carbonate increases the low shear rate viscosity and enhances the thermal stability of the fluids as evidenced by the low shear rate viscosity of the fluids.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS

The fluids of this invention comprise an amorphous silica viscosifier, a biopolymer viscosifier, a fluid loss control additive, and zinc carbonate dispersed or suspended in a brine (i.e., an aqueous liquid having one or more water soluble salts dissolved therein) containing one or more water soluble zinc salts dissolved therein.

The preferred brine contains calcium bromide in addition to zinc bromide. The brine may also contain other water soluble salts dissolved therein. The concentration of calcium bromide, zinc bromide, and other water soluble salt may be any concentration up to saturation in the brine. Generally the density of the brine will be from about 1560 kg/m$^3$ to about 2400 kg/m$^3$ (13 lbm/gal to 20 lbm/gal). As indicated hereinbefore, such brines are well known in the art. Commercially available are a calcium bromide brine having a density of 1704 kg/m$^3$ (14.2 lbm/gal), a calcium bromide/zinc bromide brine having a density of 2304 kg/m$^3$ (19.2 lbm/gal), and combinations of these brines with other brines or water soluble salts. The brine may contain from about 0.2% zinc to about 25% zinc, preferably from about 0.5% to about 16%, most preferably from about 5% to about 16% zinc.

The amorphous silica viscosifier, as known and accepted in the art, are derived either by a liquid phase or a vapor process. Silicas obtained by the vapor process are called fumed or pyrogenie silicas. Products obtained by the liquid process are categorized as silica gels and precipitated silicas.

Silica, to be an effective thickening agent must be of a fine size. By fine size is meant that the silica must be in a particle size range of less than 100 millimicrons. These silica materials may either initially be of this small particle size, or be capable of being easily deaggregated or disintegrated to this small particle size when mixed into the liquid to be thickened. Very useful silica thickeners have generally been produced by pyrogenie techniques. These silicas are the thermal decomposition silicon product of silicon tetrachloride. A prime characteristic of these pyrogenic silica materials is that they are loosely aggregated to about a 0.5 to 5 micron size, but which when mixed into a liquid readily deaggregate to less than 100 millimicron sized particles.

Silica thickening agents have also been produced by aerogel processes. Generally these are not as good in thickening liquids as pyrogenic silicas.

U.S. Pat. No. 4,216,113 discloses a modified hydrogel process which produces silica thickening agents of a particle size range of 0.5 to 5 micrometers. It is readily deaggregated under conventional mixing to particle sizes of less than 100 millimicrons. A commercially available precipitated silica viscosifier is HI-SIL T-600, a product of PPG Industries, Inc. It has an average ultimate particle size of 21 millimicrons and an average agglomeration size of 1.6 microns (micrometers).

The pyrogenie, fumed silicas are preferred.

The biopolymer viscosifier useful in the practice of this invention is preferably a xanthomonas gum (xanthan gum). Xanthomonas gum is available commercially. It is a widely used viscosifier and suspending agent in a variety of fluids, Xanthomonas gum can be made by the fermentation of carbohydrate with bacteria of the genus Xanthomonas. Representative of these bacteria are *Xanthomonas campestris, Xanthomonas phaseoli, Xanthomonas mulvacearn, Xanthomonas carotoe, Xanthomonas traslucens, Xanthomonas hederae,* and *Xanthomonas papavericoli.* The gum produced by the bacteria Xanthomonas campestris is preferred for the purpose of this invention. The fermentation usually involves inoculating a fermentable broth containing a carbohydrate, various minerals and a nitrogen yielding compound. A number of modifications in the fermentation procedure and subsequent processing are commercially used. Due to the variety of fermentation techniques and difference in processing operation subsequent to fermentation, different production lots of xanthomonas gum will have somewhat different solubility and viscosity properties. Xanthomonas gums useful in the practice of the present invention are relatively hydratable xanthomonas gums.

The colloid is a polymer containing mannose, glucose, glucuronic acid salts such as potassium glucuronate, sodium glucuronate, or the like, and acetyl radicals. Other Xanthomonas bacteria have been found which produce the hydrophilic gum and any of the xanthan gums and their derivatives can be used in this invention. Xanthan gum is a high molecular weight linear polysaccharide that is readily soluble in water to form a viscous fluid.

Other biopolymers prepared by the action of other bacteria, or fungi, on appropriate fermentation mediums may be used in the fluids of the present invention provided that they impart the desired thermally stable theological characteristics thereto. This can be readily determined by one skilled in the art in accordance with the teachings of this specification.

The term "biopolymer" is intended to mean an excellular polysaccharide of high molecular weight, in excess of 500,000, produced by fermentation of a carbohydrate source by the action of bacteria or fungi. Representative microorganisms are the genus Xanthomonas, Pseudomonas, Agrobacterium, Arthrobacter, Rhizobium, Alcaligenes, Beijerincka, and Sderotium. A succinoglucan type polysaccharide produced by microorganism such as NCIB 11592 and NCIB 11883 is commercially available.

Polymeric fluid loss control additives used in well drilling and servicing fluids are so-called water soluble polymers including pregelatinized starch, starch derivatives, cellulose derivatives, lignocellulose derivatives, and synthetic polymers. Representative starch derivatives include: hydroxyalkyl starches such as hydroxyethyl starch, hydroxypropyl starch, hydroxypropyl carboxymethyl starch, the slightly crosslinked derivatives thereof, and the like; carboxymethyl starch and the slightly crosslinked derivatives thereof; cationic starches such as the tertiary aminoalkyl ether derivatives of starch, the slightly crosslinked derivatives thereof, and the like. Representative cellulose derivatives include low molecular weight carboxymethyl cellulose, and the like. Representative lignocellulose derivatives include the alkali metal and alkaline earth metal salts of lignosulfonic acid and graft copolymers thereof. Representative synthetic polymers include vinyl sulfonate copolymers, and polymers containing other sulfonate monomers.

The preferred polymeric fluid loss control additives used in the invention are the starch ether derivatives such as hydroxyethyl starch, hydroxypropyl starch, dihydroxypropyl starch, carboxymethyl starch, hydroxyalkyl carboxymethyl starch, and cationic starches, and the slightly crosslinked derivatives of these starch ethers.

Preferably the polymeric fluid loss control additive is a starch ether derivative which has been slightly crosslinked, such as with epichlorohydrin, phosphorous oxychloride, soluble trimetaphosphates, linear dicarboxylic acid anhydrides, $N,N^1$-methylenebisacrylamide, and other reagents containing two or more functional groups which are able to react with at least two hydroxyl groups. The preferred crosslinking reagent is epichlorohydrin. Generally the treatment level is from about 0.005% to 0.1% of the starch to give a low degree of crosslinking of about one crosslink per 200 to 1000 anhydroglucose units. The crosslinking may be undertaken before or after the starch is derivatized. Additionally, the starch may be modified by acid or enzyme hydrolysis or oxidation, to provide a lower molecular weight, partially depolyermized, starch polymer for derivatization. Alternatively, the starch ether derivative may be modified by add hydrolysis or oxidation to provide a lower molecular weight starch ether derivative. The book entitled *"Modified Starches: Properties and Uses,"* by O. B. Wurzburg, 1986 (CKC Press, Inc., Boca Katon, Fla., U.S.A.) is an excellent source for information in the preparation of starch derivatives.

Most preferably, the fluid loss control additive of this invention is either (1) a crosslinked ether derivative of a partially depolymerized starch or (2) a partially depolymerized crosslinked ether derivative of starch. In the former case (1) the starch is partially depolymerized prior to crosslinking and derivatizing the starch, whereas in the latter case (2) the starch is first crosslinked and derivatized prior to partially depolymerizing the starch derivative. In either case, the molecular weight of the crosslinked starch derivative is decreased by the partial depolymerization of the starch polymer.

In case (1), it is preferred that the starch be hydrolyzed or depolymerized to the extent that the viscosity of an aqueous dispersion of the starch is reduced about 25% to about 92%, preferably about 50% to about 90%, prior to crosslinking and derivatizing the starch. In case (2), it is preferred that the crosslinked starch derivative be hydrolyzed or depolymerized to the extent that the viscosity of a water dispersion of the starch derivative at a concentration of 60 kg/m$^3$ is reduced about 15% to about 50%, preferably about 20% to about 40%.

Zinc carbonate is generally obtained by precipitation from aqueous solutions of soluble zinc salts, such as zinc chloride. Depending on the pH and processing conditions, either zinc carbonate, $ZnCO_3$, or basic zinc carbonate can be obtained. Basic zinc carbonate as is well known comprises mixtures of zinc hydroxide and zinc carbonate. For the purposes of this invention, the term "zinc carbonate" as used herein includes basic zinc carbonate, which has been also called zinc hydroxycarbonate.

The preferred fluids of this invention contain a particulate bridging agent. The particle size distribution of the bridging agent must be sufficient to bridge across and seal the pores in the subterranean formations contacted by the fluids. The range of sizes should include some very fine particles and some particles large enough to bridge the largest pores of substantially all permeable earth formations other than those which are characterized by lost circulation problems. Such "very fine" particles preferably have sizes of from about 0.01 to about 2 microns (micrometers) and such "bridging size" particles preferably have sizes from about 2 microns to less than about 800 microns. The very fine particles will help to decrease the permeability of the filter cake as soon as it starts to form. This results in extremely thin filter cakes deposited by the fluids of this invention.

The amount of particles and the size distribution and range of the particles should be such that the "mud spurt" (the invasion of the formation by whole fluid while a filter cake is being formed) is relatively low. The mud spun is low when the fluid contains an adequate distribution of particle sizes in the bridging size range and an adequate total proportion, in the order of at least one percent by weight, of solid particles. The bridging agent must not be appreciably soluble in the zinc-containing brine used to prepare the fluid.

Representative acid soluble bridging agents include calcium carbonate, dolomite (calcium/magnesium carbonate), iron carbonate, and other carbonates, as well as water insoluble metal oxides or hydroxides. Representative water soluble salts include sodium chloride, potassium chloride, calcium chloride, sodium formate, potassium formate, cesium formate, sodium bromide, potassium bromide, calcium bromide, sodium acetate, potassium acetate, and the like.

When the bridging agent is water soluble, it is preferred that the brine be saturated with respect to the bridging agent, or at least substantially saturated such that less than 10% by weight of the bridging agent is dissolved in the brine.

Optionally, but preferably, the fluids of this invention contain an alkaline buffer and a low molecular weight polar additive.

The alkaline buffer may be any alkaline particulate material having a low water solubility which will react with acids to decrease the acidity of the fluids. Representative alkaline buffers are magnesium oxide, calcium oxide, zinc oxide, calcined dolomite, magnesium hydroxide, calcium hydroxide, zinc hydroxide, hydrated dolomitic lime (calcium/magnesium hydroxide), and the like, preferably zinc oxide or magnesium oxide. Most preferably the buffer is zinc oxide. It has been unexpectedly found that the use of zinc oxide in combination with the zinc carbonate increases the thermal stability of the fluids as indicated by the low shear rate viscosity after heating the fluids at elevated temperatures.

In accordance with this invention, the fluids should exhibit pH's in the range from about 3.0 to about 6.0. Although the actual pH's of highly concentrated salt solutions cannot be accurately read using a pH meter, the relative pH's of several different highly concentrated salt solutions may be accurately compared. Thus, the measured pH's of such highly concentrated solutions become a reliable monitoring method for determining the relative acidity of the fluids involved. The measured pH's are determined with a standard pH meter, the electrode of which is inserted into the solution to be measured. As used herein, the term "measured pH" refers to pH's determined in the foregoing manner. Where it is necessary to adjust the measured pH, the adjustment may be carded out at substantially any time in accordance with this invention.

The low molecular weight polar additives useful in this invention have a molecular weight less than about 400 and contain one or more polar groups per molecule selected from the group consisting of hydroxyl, amino, and mixtures thereof. These include alcohols, alkylene glycols, polyalkylene glycols, alkyl ethers of alkylene glycols and polyalkylene glycols, amines, alkylene diamines, polyalkylene polyamines, piperazines, aminoalcohols, and the like. The preferred polar additives have the empirical formula $$HO-C_aH_{2a}-Z$$

where a is an integer from 1 to about 5, and Z is a radical selected from the group consisting of H, and $(OC_bH_{2b})_nOR$, where b is 2, 3, or mixtures thereof, n is an integer from 0 to about 3, and K is a radical selected from the group consisting of H, $C_xH_{2x+1}$, and $C_yH_{2y+1}CO$, where x is an integer from 1 to 5, and y is an integer from 1 to 3. Preferably a=2 or 3, $Z=(OC_bH_{2b})_nOR$. Thus it is preferred that the water soluble hydroxy-containing polar additive contain at least two hydroxyl groups or at least one hydroxyl and at least one ether group or radical within its molecular structure.

The polar additive may serve several functions in the fluids of this invention. The polar additive may serve to scavenge (react with) dissolved oxygen in the fluids, may serve to bond between the surface hydroxyls on the particles of the silica viscosifier, and may serve to activate or presolvate the polymeric fluid loss control additive and biopolymer in the zinc-containing brines.

Any particulate materials in the fluids of this invention may function as bridging agents or contribute to the bridging and sealing of the formations contacted by the fluids. Thus the zinc carbonate and alkaline buffer may contain, and usually will contain, particles within the bridging particle size range. If the concentration of these particles and their particle size distribution is sufficient, less supplementary bridging particles will be required or indeed may not be necessary. The very fine particles will help to decrease the permeability of the filter cake as soon as it starts to form as mentioned previously.

The concentrations of the additives in the fluids of this invention are as follows:

|  | kg/m³ | lbm/bbl | kg/m³ | lbm/bbl |
| --- | --- | --- | --- | --- |
| Silica Viscosifier | 1.4–14.3 | 0.5–5 | 2.8–11.4 | 1–4 |
| Biopolymer Viscosifier | 0.7–11.4 | 0.25–4 | 1.4–8.6 | 0.5–3 |
| Fluid Loss Control Additive | 8.5–42.8 | 3–15 | 14.3–28.6 | 5–10 |
| Zinc Carbonate | 14.3–143 | 5–50 | 22.8–114 | 8–40 |
| Bridging Agent | 0–143 | 0–50 | 0–114 | 0–40 |
| Alkaline Buffer | 0–28.6 | 0–10 | 0–14.3 | 0–5 |
| Polar Additive | 0–42.8 | 0–15 | 0–28.6 | 0–10 |

The preferred fluids of this invention are characterized as having a Low Shear Rate Viscosity of at least 3000 centipoise, a Spurt Loss no greater than 2 cubic centimeters, and a thirty (30) minute Fluid Loss less than 10 cubic centimeters. The Low Shear Rate Viscosity (LSRV) for purposes of this invention is obtained using a Brookfield Model LVTDV-I viscometer having a number of 2 or 3 spindle at 0.3 revolutions per minute (shear rate of 0.063 sec$^{-1}$). The LSRV is indicative of the suspension properties of the fluid, the larger the LSRV, the better is the suspension of solids in the fluid. The Spurt Loss and Fluid Loss for purposes of this invention are obtained by a modified API filtration test. Thus to an API high temperature filtration cell with removable end cages is added a 5 micrometer pore throat ceramic disc. The size of the ceramic disc is 6.35 centimeters in diameter and 0.635 centimeters in depth. The filtration test is then conducted for 30 minutes at the desired temperature of 82.2° C. (1 80° F.) under a pressure differential of 17.59 kg/cm² (250 pounds per square inch) supplied by nitrogen. The spurt loss is measured as the mount of fluid expelled from the filtration cell until the flow of fluid is reduced to drops. The fluid loss is measured as the total amount of fluid collected in 30 minutes.

The fluids of this invention can be prepared by mixing together the brine, fluid loss control additive, silica, biopolymer, zinc carbonate, and bridging agent, the alkaline buffer and polar additive, if used, in any order. However, it is preferred that the fluid loss control additive and biopolymer first are hydrated in a brine having a density no greater than about 1650 kg/m³ containing the polar additive, if any. Subsequently, the remaining brine having the density required to obtain a fluid having the desired density, the silica, and the zinc carbonate are mixed therein. Any additional desired additives such as the alkaline buffer and bridging agent are mixed therein.

The fluids of this invention can thus be prepared preferably by dispersing the fluid loss control additive and biopolymer in a brine having a density no greater than about 1650 kg/m³ containing the polar additive, if any, adding the remaining brine having the density required to obtain a fluid having the desired density, adding the silica viscosifier, the zinc carbonate, the bridging agent, the alkaline buffer, and any additional desired additives, and mixing thoroughly.

In order to more completely describe the invention, the following nonlimiting examples are given. In these examples and this specification, the following abbreviations may be used: API=American Petroleum Institute; FLCA=fluid loss control additive; sec.=seconds; min.=minutes; lbm/gal=pounds per U.S. gallon; μm=micrometers (microns); g.=grams; cc=cubic centimeters; m=meter; °C. =degrees Centigrade; °F.=degrees Fahrenheit; ppg=pounds per gallon; %=percent by weight; kg/m³=kilograms per cubic meter; PV=plastic viscosity in centipoise; YP=yield point in pascals; GS=10 second/10 minute gel strengths in pascals; LSRV=Brookfield low shear viscosity at 0.3 revolutions per minute, in centipoise; HTI-IP=high temperature, high pressure.

The plastic viscosity, yield point, and gel strengths were obtained by the procedures set forth in API's Recommended Practice 13B-1.

Two base brines are used in the examples, as follows: The CaBr₂ Brine is a 1704 kg/m³ calcium bromide brine containing approximately 51.9 weight % of CaBr₂; the ZnBr₂ Brine is a 2304 kg/m³ zinc bromide/calcium bromide brine containing approximately 52.8 weight % of ZnBr₂ and 22.8 weight % of CaBr₂.

Two bridging agents have been used in the examples: Calcium Carbonate No. 1 and Calcium Carbonate No. 2 are sized calcium carbonate having the particle size distribution set forth hereinbelow. The particle size distribution of the zinc carbonate, zinc oxide, and magnesium oxide used in the examples are also set forth below. The particle sizes were determined with Malvern Instruments' MASTER SIZER E.

| | PARTICULATE ADDITIVES | | | | | | | |
|---|---|---|---|---|---|---|---|---|
| | % of Particles Less than | | | | | | 100% | Avg. |
| Particulate | 5 μm | 10 μm | 20 μm | 30 μm | 44 μm | 74 μm | <μm | μm |
| Calcium Carbonate No. 1 | 23.7 | 38.9 | 61.1 | 77.2 | 91.4 | 99.8 | 80 | 14.5 |
| Calcium Carbonate No. 2 | 53.8 | 72.3 | 84.4 | 90.7 | 96.6 | 100 | 63 | 4.3 |
| Zinc Carbonate | 27.5 | 65.9 | 87.2 | 90.0 | 91.4 | 95.4 | 149 | 7.45 |
| Zinc Oxide | 11.5 | 17.9 | 28.7 | 40.0 | 53.9 | 74.7 | 180 | 39.6 |
| Magnesium Oxide | 24.6 | 45.5 | 81.0 | 93.8 | 98.7 | 100 | 53 | 10.95 |

EXAMPLE I

Low solids, high density fluids having a density of 2100 kg/m$^3$ (17.5 ppg) were prepared as follows: the quantity of a 1704 kg/m$^3$ (14.2 ppg) calcium bromide brine indicated in Table A, 2.5 g of an acid treated, hydroxypropylated corn starch which s had been slightly crosslinked with epichlorohydrin, 1.5 g of xanthan gum, 0.1 cc of diethyleneglycol, 0.1 cc of a silicone defoamer, and the quantity of water indicated in Table A were mixed together for 15 minutes on a Hamilton Beach mixer. Thereafter there were added 3 g of Cab-O-Sil M5 silica viscosifier, and the concentration of a 2304 kg/m$^3$ (19.2 ppg) zinc bromide/ calcium bromide brine, zinc oxide, zinc carbonate, magnesium oxide, and calcium carbonate no. 1 set forth in Table A and the fluids mixed 4 minutes with a Brookfield mixer. The viscosities and pH of the fluids were then determined. The fluids were hot rolled at 82.2° C. for 16 hours and the viscosities and pH again determined after cooling to 48.9° C. Duplicate fluids were prepared and the viscosities and pH determined after static aging at 82.2° C. for 16 hours and cooling to 48.9° C.

The data obtained are set forth in Table B and C.

EXAMPLE II

Fluids were prepared as in Example I except that the fluids contained 3 cc of diethyleneglycol. The compositions of the fluids are set forth in Table A and the data obtained are set forth in Table D.

EXAMPLE III

Fluids having the densities set forth in Table E were prepared as follows: the quantity of a 1704 kg/m$^3$ (14.2 ppg) calcium bromide brine indicated in Table E was mixed for 15 minutes with 6 g of the acid treated, hydroxypropylated corn starch which had been slightly crosslinked with epichlorohydrin, 2 g of xanthan gum, 0.1 cc of diethyleneglycol, 0.1 cc of a silicone defoamer, and the quantity of water indicated in Table E. Thereafter there were added 2 g of Cab-O-Sit M5 silica viscosifier, 5 g of zinc oxide, 10 g of zinc carbonate, 10 g of calcium carbonate No. 2, and the quantity of a 2304 kg/m$^3$ (19.2 ppg) zinc bromide/ calcium bromide brine set forth in Table E and the fluids mixed 4 minutes. The fluids were evaluated as in Example I and II. The data obtained are set forth in Table E.

The fluids containing no zinc carbonate are not examples of fluids of this invention. They were evaluated for comparison purposes only.

As noted hereinbefore, the preferred fluids contain both zinc carbonate and zinc oxide.

EXAMPLE IV

Low solids, high density fluids having the density indicated in Table F were prepared as in Example I using the quantity of ingredients set forth in Table F. These fluids were evaluated for the low shear rate viscosity and the high temperature, high pressure fluid loss at 82.2° C. (180° F.), after hot rolling for 16 hours at 82.2° C. (1 80° F.). The data obtained are set forth in Table F

TABLE A

| Fluid | cc CaBr$_2$ Brine | cc Water | cc ZnBr$_2$ Brine | g ZnO | g ZnCO$_3$ | g MgO | g CaCO$_3$ No. 1 |
|---|---|---|---|---|---|---|---|
| I-1 | 102.9 | 16.1 | 224 | 5 | 24 | 0 | 0 |
| I-2 | 102.9 | 16.1 | 224 | 0 | 24 | 5 | 0 |
| I-3 | 94.5 | 14.0 | 231 | 5 | 0 | 0 | 24 |
| I-4 | 94.5 | 14.0 | 231 | 0 | 0 | 5 | 24 |
| I-5 | 96.6 | 15.4 | 234.5 | 5 | 16 | 0 | 0 |
| I-6 | 102.9 | 16.1 | 224 | 7 | 24 | 0 | 0 |
| I-7 | 101.5 | 14.0 | 227.5 | 7 | 18 | 0 | 6 |
| I-8 | 98.0 | 14.0 | 231 | 7 | 12 | 0 | 10 |
| I-9 | 102.9 | 16.1 | 224 | 5 | 24 | 2 | 0 |
| I-10 | 102.9 | 16.1 | 224 | 2 | 24 | 5 | 0 |
| II-1 | 102.9 | 16.1 | 224 | 7 | 24 | 0 | 0 |
| II-2 | 102.9 | 16.1 | 224 | 0 | 24 | 7 | 0 |
| II-3 | 94.5 | 14.0 | 231 | 7 | 0 | 0 | 24 |
| II-4 | 94.5 | 14.0 | 231 | 0 | 0 | 7 | 24 |
| II-5 | 98.0 | 14.0 | 231 | 7 | 12 | 0 | 10 |

TABLE B

| Fluid | I-1 | I-2 | I-3 | I-4 | I-5 |
|---|---|---|---|---|---|
| Initial Properties | | | | | |
| PV | 65 | 65 | 50 | 57 | 56 |
| YP | 26.8 | 26.3 | 21.5 | 21.1 | 26.8 |
| GS, 10 sec. | 3.35 | 3.35 | 2.87 | 2.39 | 3.35 |
| GS, 10 min. | 5.75 | 6.22 | 3.35 | 2.39 | 5.27 |
| LSRV | 28,600 | 25,200 | 8,400 | 3,700 | 19,100 |
| pH | 3.40 | 4.05 | 3.56 | 4.17 | 3.46 |
| Hot Rolled at 82.2° C. for 16 hours | | | | | |
| PV | 63 | 73 | 55 | 69 | 60 |
| YP | 25.8 | 26.8 | 23.5 | 26.8 | 26.3 |
| GS, 10 sec. | 2.87 | 2.87 | 2.39 | 3.35 | 2.87 |
| GS, 10 min. | 5.27 | 4.31 | 3.35 | 5.27 | 4.31 |
| LSRV | 10,600 | 4,500 | 5,000 | 3,300 | 13,000 |
| pH | 3.75 | 4.10 | 3.52 | 4.35 | 3.5 |
| Static Aged at 82.2° C. for 16 hours | | | | | |
| PV | 60 | 81 | 57 | 69 | 56 |
| YP | 26.3 | 29.2 | 24.4 | 26.8 | 24.4 |

TABLE B-continued

| Fluid | I-1 | I-2 | I-3 | I-4 | I-5 |
| --- | --- | --- | --- | --- | --- |
| GS, 10 sec. | 3.35 | 3.35 | 3.35 | 3.35 | 2.87 |
| GS, 10 min. | 5.27 | 5.75 | 3.83 | 5.27 | 4.31 |
| LSRV | 12,800 | 20,000 | 5,600 | 8,600 | 12,300 |
| pH | 4.10 | 4.45 | 3.42 | 4.14 | 3.60 |

TABLE C

| Fluid | I-6 | I-7 | I-8 | I-9 | I-10 |
| --- | --- | --- | --- | --- | --- |
| *Initial Properties* | | | | | |
| PV | 60 | 67 | 59 | 67 | 84 |
| YP | 27.8 | 29.2 | 27.3 | 27.3 | 32.6 |
| GS, 10 sec. | 3.35 | 3.35 | 3.35 | 3.35 | 3.83 |
| GS, 10 min. | 5.27 | 4.79 | 4.79 | 5.27 | 5.75 |
| LSRV | 19,600 | 20,600 | 14,000 | 23,800 | 16,000 |
| pH | 3.85 | 3.95 | 3.85 | 3.95 | 4.40 |
| *Hot Rolled at 82.2° C. for 16 hours* | | | | | |
| PV | 59 | 63 | 69 | 66 | 66 |
| YP | 23.5 | 23.9 | 27.8 | 23.9 | 25.4 |
| GS, 10 sec. | 2.39 | 2.87 | 4.79 | 2.39 | 2.39 |
| GS, 10 min. | 4.31 | 4.31 | 5.27 | 4.31 | 4.31 |
| LSRV | 11,500 | 12,500 | 11,000 | 9,000 | 5,800 |
| pH | 3.95 | 4.0 | 3.5 | 4.10 | 4.45 |
| *Static Aged at 82.2° C. for 16 hours* | | | | | |
| PV | 61 | 69 | 66 | 68 | 71 |
| YP | 25.9 | 26.8 | 27.8 | 26.8 | 28.7 |
| GS, 10 sec. | 2.87 | 3.83 | 4.31 | 2.87 | 2.87 |
| GS, 10 min. | 4.79 | 4.79 | 6.70 | 5.27 | 4.79 |
| LSRV | 18,000 | 11,400 | 15,100 | 10,900 | 14,800 |
| pH | 4.0 | 3.75 | 3.55 | 3.91 | 4.10 |

TABLE D

| Fluid | II-1 | II-2 | II-3 | II-4 | II-5 |
| --- | --- | --- | --- | --- | --- |
| *Initial Properties* | | | | | |
| PV | 59 | 50 | 41 | 38 | 58 |
| YP | 26.3 | 21.1 | 9.1 | 11.5 | 23.9 |
| GS, 10 sec. | 3.35 | 3.35 | 1.92 | 1.92 | 3.35 |
| GS, 10 min. | 5.27 | 3.83 | 2.39 | 2.39 | 3.83 |
| LSRV | 22,500 | 18,000 | 2,400 | 2,500 | 14,200 |
| pH | 3.53 | 3.67 | 3.90 | 3.56 | 3.40 |
| *Hot Rolled at 82.2° C. for 16 hours* | | | | | |
| PV | 65 | 85 | 62 | 74 | 62 |
| YP | 26.8 | 24.4 | 23.5 | 28.2 | 23.5 |
| GS, 10 sec. | 3.35 | 2.87 | 2.39 | 2.87 | 3.83 |
| GS, 10 min. | 4.79 | 4.79 | 3.83 | 4.31 | 4.79 |
| LSRV | 14,000 | 2,400 | 5,300 | 2,100 | 13,700 |
| pH | 3.60 | 4.45 | 3.80 | 4.25 | 3.0 |
| *Static Aged at 82.2° C. for 16 hours* | | | | | |
| PV | 62 | 86 | 57 | 74 | 66 |
| YP | 25.8 | 29.2 | 26.8 | 27.8 | 27.8 |
| GS, 10 sec. | 2.87 | 4.31 | 3.35 | 4.31 | 5.27 |
| GS, 10 min. | 4.31 | 5.75 | 3.83 | 4.79 | 6.70 |
| LSRV | 14,000 | 5,000 | 4,300 | 8,100 | 18,200 |
| pH | 3.65 | 4.32 | 3.75 | 4.25 | 3.55 |

TABLE E

| Fluid | III-1 | III-2 | III-3 | III-4 |
| --- | --- | --- | --- | --- |
| $CaBr_2$ Brine, cc | 297.5 | 283.5 | 269.5 | 225.5 |
| Water, cc | 45.5 | 45.5 | 42 | 38.5 |
| $ZnBr_2$ Brine, cc | 3.5 | 17.5 | 35 | 52.5 |

TABLE E-continued

| Fluid | III-1 | III-2 | III-3 | III-4 |
| --- | --- | --- | --- | --- |
| Density, kg/m³ | 1656 | 1680 | 1708 | 1746 |
| *Initial Properties* | | | | |
| PV | 49 | 46 | 37 | 44 |
| YP | 33.0 | 36.4 | 30.2 | 34.5 |
| GS, 10 sec. | 9.58 | 10.05 | 7.66 | 8.62 |
| GS, 10 min. | 11.01 | 10.53 | 8.62 | 10.53 |
| LSRV | 86,000 | 91,500 | 51,100 | 79,500 |
| pH | 6.17 | 6.00 | 5.59 | 5.49 |
| *Hot Rolled at 82.2° C. for 16 hours* | | | | |
| PV | 34 | 39 | 37 | 38 |
| YP | 28.2 | 29.7 | 31.6 | 31.1 |
| GS, 10 sec. | 7.66 | 6.70 | 9.10 | 9.10 |
| GS, 10 min. | 8.62 | 7.18 | 10.05 | 10.05 |
| LSRV | 41,800 | 22,600 | 31,500 | 35,300 |
| pH | 5.71 | 5.86 | 5.65 | 5.42 |
| *Static Aged at 82.2° C. for 16 hours* | | | | |
| PV | 39 | 45 | 40 | 41 |
| YP | 31.1 | 29.7 | 33.5 | 34.0 |
| GS, 10 sec. | 7.66 | 7.66 | 9.58 | 9.58 |
| GS, 10 min. | 8.14 | 8.14 | 11.01 | 10.05 |
| LSRV | 36,000 | 35,900 | 71,200 | 58,900 |
| pH | 6.29 | 5.89 | 5.65 | 5.39 |

TABLE F

| Fluid | IV-1 | IV-2 | IV-3 | IV-4 | IV-5 |
| --- | --- | --- | --- | --- | --- |
| $CaBr_2$ Brine, cc | 102.9 | 98 | 98 | 101.5 | 199.5 |
| ATHPXLS[(1)], g | 2.5 | 2.5 | 2.5 | 2.5 | 8 |
| Xanthan Gum, g | 1.5 | 1.5 | 1.75 | 2.25 | 1.55 |
| Diethyleneglycol, cc | 0.1 | 0.1 | 2.0 | 2.0 | 0.1 |
| Silicone Defoamer, cc | 0.1 | 0.1 | 0.1 | 0.1 | 0.1 |
| Water, cc | 16.1 | 14 | 14 | 17.5 | 31.5 |
| $ZnBr_2$ Brine, cc | 224 | 231 | 231 | 220.5 | 115.5 |
| Zinc Oxide, g | 7 | 7 | 8 | 12 | 5 |
| Cab-O-Sil M5, g | 3 | 3 | 3 | 3 | 2 |
| Zinc Carbonate, g | 24 | 12 | 10 | 10 | 6 |
| Calcium Carbonate No. 1, g | 0 | 10 | 0 | 0 | 0 |
| Calcium Carbonate No. 2, g | 0 | 0 | 10 | 10 | 10 |
| *Initial Properties* | | | | | |
| LSRV, cp | 19,600 | 14,500 | 14,400 | 24,000 | 30,000 |
| Density, kg/m³ | 2100 | 2100 | 2100 | 2100 | 1860 |
| *Hot Rolled at 82.2° C. for 16 hours* | | | | | |
| LSRV, cp | 11,500 | 8,800 | 7,200 | 5,500 | 12,000 |
| HTHP Fluid Loss, cc. | | | | | |
| 30 minutes | 7.0 | 5.25 | 6.25 | 5.0 | 4.75 |
| 60 minutes | 9.5 | 7.25 | 8.0 | 6.0 | 5.5 |

[(1)]ATHPXLS = acid treated, hydroxypropylated, epichlorohydrin crosslinked starch

What is claimed is:

1. A fluid useful in various downhole oil and gas well operations which comprises a brine having dissolved therein a zinc salt and, optionally, one or more additional water soluble salts, the brine having a density from about 1560 kg/m³ to about 2400 kg/m³, a silica viscosifier having an ultimate particle size less than about 100 millimicrons, a biopolymer viscosifier, a fluid loss control additive, and zinc carbonate, wherein the zinc carbonate is present in an mount sufficient to increase the low shear rate viscosity of the fluid.

2. The fluid of claim 1 wherein the zinc salt is zinc bromide.

3. The fluid of claim 2 wherein the fluid loss additive is a starch ether. derivative selected from the group consisting of hydroxyethyl starch, hydroxypropyl starch, dihydroxypropyl starch, carboxymethyl starch, hydroxyalkyl carboxymethyl starch, cationic starch, and the slightly crosslinked derivatives thereof having about one crosslink per 200 to 1000 anhydroglucose units in the starch derivative, and mixtures thereof.

4. The fluid of claim 3 wherein the starch ether derivative is derived from a starch which has been partially hydrolyzed to decrease the molecular weight of the starch or wherein the starch ether derivative has been partially depolymerized to decrease the molecular weight thereof.

5. The fluid of claim 1, 3, or 4 wherein the fluid contains from about 1.4 to about 14.3 kg/m$^3$ of the silica viscosifier, from about 0.7 to about 11.4 kg/m$^3$ of the biopolymer, from about 8.5 to about 42.8 kg/m$^3$ of the fluid loss control additive, from about 14.3 to about 143 kg/m$^3$ of the zinc carbonate, from 0 to about 28.6 kg/m$^3$ of an alkaline buffer, from 0 to about 143 kg/m$^3$ of a bridging agent, and from 0 to about 42.8 kg/m$^3$ of a polar additive.

6. The fluid of claim 1, 3, or 4 wherein the silica is a fumed silica and the biopolymer is a xanthan gum.

7. The fluid of claim 5 wherein the silica is a fumed silica and the biopolymer is a xanthan gum.

8. The fluid of claim 7 wherein the bridging agent is selected from the group consisting of sodium chloride, calcium carbonate, and mixtures thereof.

9. The fluid of claim 7 wherein the bridging agent is calcium carbonate and the alkaline buffer is zinc oxide.

10. The fluid of claim 7 wherein the bridging agent is calcium carbonate, the alkaline buffer is selected from the group consisting of magnesium oxide, zinc oxide, and mixtures thereof, and wherein the polar additive has the empirical formula HO—$C_aH_{2a}$—Z, where a is an integer from 1 to about 5, and Z is a radical selected from the group consisting of H and $(OC_bH_{2b})_nOR$, where b is 2, 3, or mixtures thereof, n is an integer from 0 to about 3, and R is a radical selected from the group consisting of H, $C_xH_{2y+1}CO$, where x is an integer from 1 to 5, and y is an integer from 1 to 3.

11. The method of increasing the low shear rate viscosity of a fluid, the fluid comprising a brine having dissolved therein a zinc salt and one or more additional water soluble salts, the brine having a density from about 1560 kg/m$^3$ to about 2400 kg/m$^3$, a silica viscosifier having an ultimate particle size less than about 100 millimicrons, a biopolymer viscosifier, and a fluid loss control additive, which comprises adding to the fluid zinc carbonate.

12. The method of claim 11 wherein the zinc salt is zinc bromide, the silica is a fumed silica, the biopolymer is a xanthan gum, and the fluid loss control additive is selected from the group consisting of starch ether derivatives which have been partially depolymerized to decrease the molecular weight thereof, and starch ether derivatives which are derived from a starch which has been partially hydrolyzed to decrease the molecular weight thereof.

13. The method of claim 12 wherein the fluid additionally contains zinc oxide.

14. The method of claim 11 wherein the fluid additionally contains zinc oxide.

* * * * *